C. T. HENDERSON.
AUTOMATIC REGULATOR.
APPLICATION FILED NOV. 22, 1913.

1,293,428.

Patented Feb. 4, 1919.
3 SHEETS—SHEET 1.

Witnesses:

Inventor
Clark T. Henderson

C. T. HENDERSON.
AUTOMATIC REGULATOR.
APPLICATION FILED NOV. 22, 1913.

1,293,428.

Patented Feb. 4, 1919.
3 SHEETS—SHEET 2.

Witnesses:
Arthur W. Carlson
R. H. Van Nest

Inventor
Clark T. Henderson
by Edwin B. H. Tower Jr.
Atty

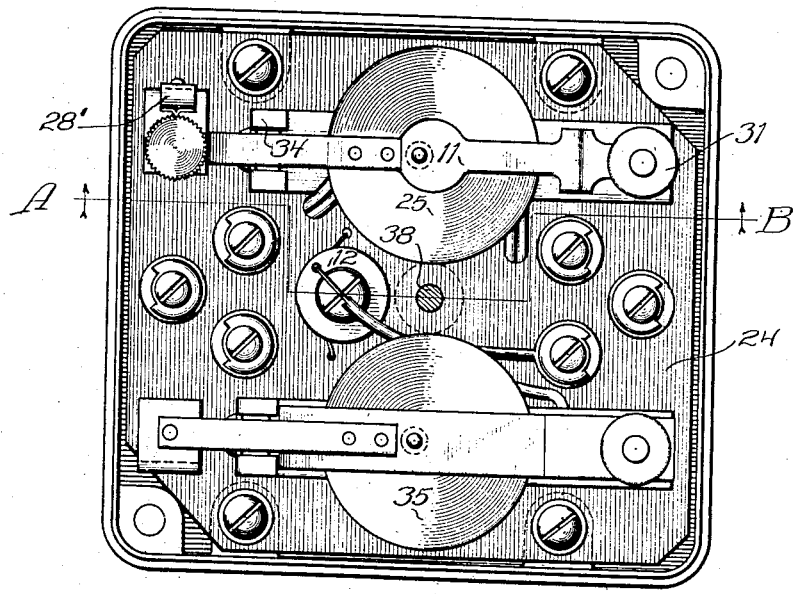
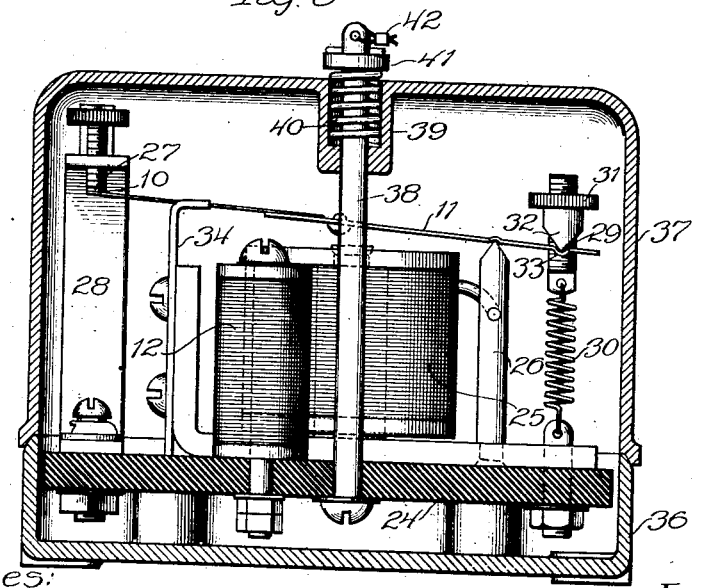

UNITED STATES PATENT OFFICE.

CLARK T. HENDERSON, OF MILWAUKEE, WISCONSIN, ASSIGNOR TO THE CUTLER-HAMMER MFG. CO., OF MILWAUKEE, WISCONSIN, A CORPORATION OF WISCONSIN.

AUTOMATIC REGULATOR.

1,293,428.  Specification of Letters Patent.  Patented Feb. 4, 1919.

Application filed November 22, 1913. Serial No. 802,497.

*To all whom it may concern:*

Be it known that I, CLARK T. HENDERSON, a citizen of the United States, residing at Milwaukee, in the county of Milwaukee and State of Wisconsin, have invented new and useful Improvements in Automatic Regulators, of which the following is a full, clear, concise, and exact description, reference being had to the accompanying drawing, forming a part of this specification.

This invention relates to improvements in automatic regulators.

The invention is especially adapted for use in automobile lighting systems which employ a generator and a storage battery to supply the lamps. When the generator speed is sufficiently high the generator charges the storage battery and supplies the lamps and when the speed is low or the generator is at rest, the battery supplies the lamps. The generator is preferably driven from the automobile engine and hence is subject to wide variations in speed and a consequent tendency to wide variations in output. The voltage necessary to charge the battery varies with the condition of the battery. Furthermore, the voltage necessary to bring the battery to a fully charged condition is higher than the discharging voltage of the battery. Consequently, regulating means must be employed to compensate for the varying voltages of the system and to regulate the generator output to supply the lamps and charge the battery under the varying conditions of service.

An object of the present invention is to provide improved regulating means which will regulate the generator output to that required to charge the battery when the lamps are not lighted and which will automatically vary the standard of regulation when the lamps are lighted.

Another object of the invention is to provide a regulator for an automobile lighting system with means for automatically reducing the voltage of the system when the lamps are lighted.

Although the invention has been illustrated and described herein as applied to an automobile lighting system it is apparent that it is adapted for use in various other systems.

Preferred forms of the invention are illustrated in the accompanying drawings, in which, Figure 1 illustrates one application of the improved regulator to an automobile lighting system.

Fig. 5 is a plan view of a preferred form of regulating apparatus with the cover of the inclosing casing removed.

Fig. 6 is a vertical section on the line A B Fig. 5.

Figure 1:
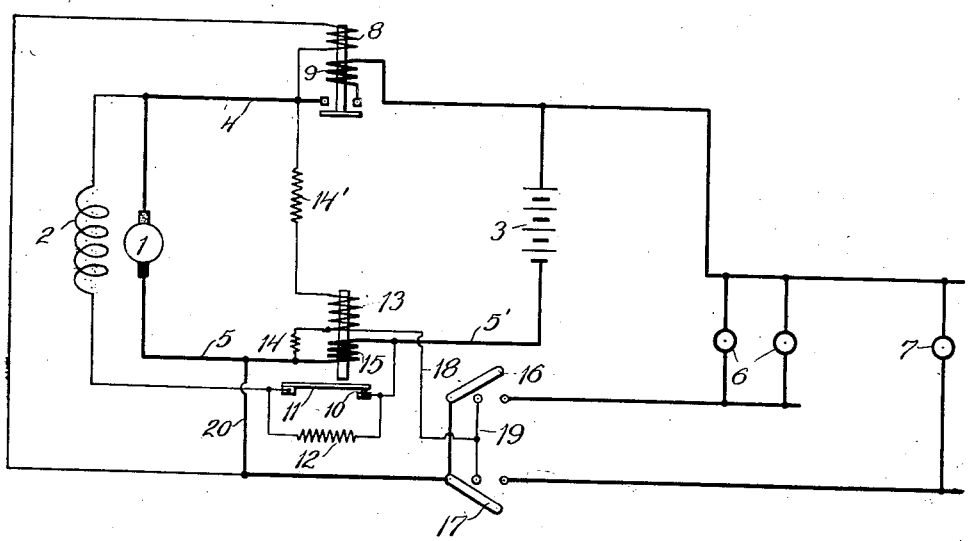

Fig. 1 illustrates a generator provided with an armature 1 and a shunt field 2. The generator armature may be conveniently driven by gearing or otherwise from the engine, or any convenient moving part of the automobile. A storage battery 3 is connected to the armature by generator leads 4 and 5. The side and tail slights 6 and the head lights 7 are adapted to be connected across the generator leads in parallel with the battery. An automatic switch may be provided in one generator lead which has a lifting coil 8 connected in shunt across the generator and a holding coil 9 connected in series in the generator lead. The shunt coil 8 is adapted to operate the switch to close the circuit between the generator and battery when the voltage is sufficiently high to charge the battery. The series and shunt coils act together to maintain the switch closed. If the generator voltage falls below the battery voltage the battery will tend to discharge through the generator, thus reversing the series coil 9 and causing the switch to open.

The automatic regulator controls the generator output by varying the effective resistance of the shunt field circuit. The regulator comprises a contact 10 carried by a vibratory armature 11 adapted to rapidly open and close a short-circuit around a resistance 12 in the shunt field circuit. The character of vibration of the contact 10 determines the effective value of the resistance as the value of the resistance is of course its mean value and is proportional to the length of the time the resistance is in circuit. The vibration of the armature is controlled by electromagnetic windings having a high resistance coil 13 connected across the generator leads through a resistance 14 and a comparatively low resistance coil 15 connected in series in the battery lead 5'. A lamp switch 16 controls the side and tail lights 6 and a switch 17 controls the head lights 7. The closure of either switch 16 or 17 serves to short-circuit the resistance 14 in circuit with the regulator shunt coil.

The operation of the system is as follows:

When the generator starts to operate its voltage will be insufficient to open the short-circuit around the resistance 12. Consequently, the generator voltage will rapidly build up until, at a predetermined speed, the voltage will be sufficient to cause the automatic switch to close the charging circuit to the battery. As the generator speed further increases, current flowing through the series coil 15 acting in conjunction with that in the shunt coil 13 will operate the vibratory contact to vary the field excitation, thereby controlling the generator output. It is a well known fact that as the storage battery is charged its potential increases reaching finally, in the case of a lead battery, a potential of 2.5 V. per cell when fully charged. As the battery voltage rises the voltage impressed upon coil 13 will rise accordingly. Since the vibratory contact 10 is operated by the combined force of the series coil 15 and the shunt coil 13, it is obvious that the higher the potential of the battery the lower the current which will be necessary in series coil 15 in order to accomplish the vibration of vibratory contact 10. By varying the proportions of these coils any desired charging characteristic may be given to the battery. It is preferable in most cases to so proportion the coils as to provide a taper charge. Operating coil 13 being ordinarily wound with copper wire, a continued flow of current through this winding will cause a rise in its temperature which will increase the resistance of the coil and thereby reduce the current flowing through it to such an extent as to noticeably vary its effectiveness. To compensate for this increase in resistance a resistance 14' may be connected in series with the coil 13. If this resistance is of substantially zero coefficient, and if its value is relatively high as compared with that of the coil 13, the increase in resistance due to the heating of the coil 13, will be negligible in proportion to the entire resistance of the shunt coil circuit so that the coil 13 will exert a predetermined pull for a given voltage on the system, regardless of its temperature rise.

Upon closure of either lamp switch a short circuit will be established around the resistance 14 and the circuit for the coil 13 will be from lead 4, through the coil 13, through conductor 18, the cross connection 19, between the lamp switches and conductor 20, to the lead 5. The effect of the regulator shunt coil 13 will be immediately increased so as to cause this coil to predominate in the regulation. As a result a substantially uniform voltage will be maintained, but at a voltage somewhat below the maximum charging voltage of the battery, so that lamps which will satisfactorily operate at the battery discharging voltage may be operated directly from the battery charging generator without the interposition of a compensating resistance in the lamp circuit.

Figure 2:
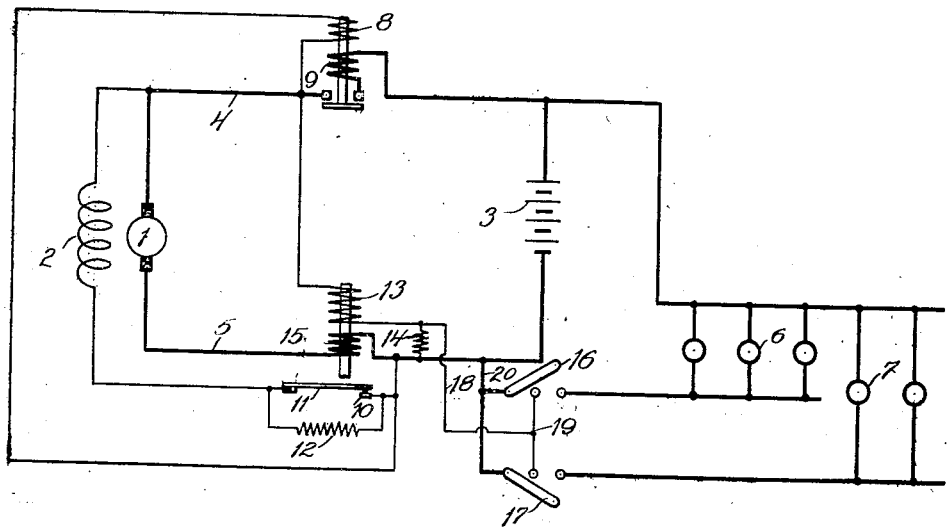
Figs. 2, 3 and 4 illustrate modified arrangements.

The system illustrated in Fig. 2 is similar to that illustrated in Fig. 1. In this modification the regulator series coil 15 is connected in the main generator lead instead of in the battery lead, and hence regulates in response to total generator current instead of in response to battery charging current. Upon closure of either lamp switch, the resistance 14 will be short-circuited and the voltage coil 13 will become sufficiently energized to predominate in the regulation and maintain a practically constant voltage upon the generator.

Figure 3:
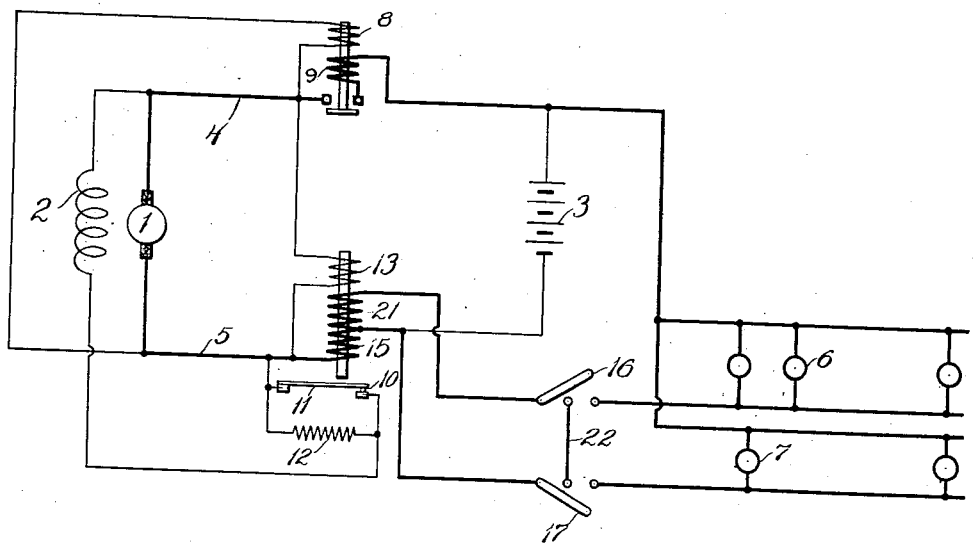

In Fig. 3 the controlling windings for the regulator are further modified. The regulator has a series winding 15 through which the total generator current flows. The shunt coil 13 is connected directly across the generator leads without the resistance 14. An additional low resistance winding 21 is connected in series with the lamps 6, upon closure of the lamp switch 16. This coil assists the coils 13 and 15. As the lamps 6 are turned on the generator voltage will be reduced due to the effect of the additional current flowing to these lamps. This current is effective both in the main series winding 15 and in the auxiliary winding 21 but as the side and tail lights are generally of low candle power the effect of this current will not be sufficient to unduly reduce the generator voltage. The head lights 7, however, are generally high candle power lamps. Therefore, when the head lights are lighted a greatly increased current will flow in the coil 15. The increased effect of this coil will be sufficient to reduce the generator voltage to the desired value without the auxiliary coil 21. A cross connection 22 is therefore provided between the lamp switches which will short-circuit the auxiliary coil 21 upon closure of the head light switch.

Figure 4:
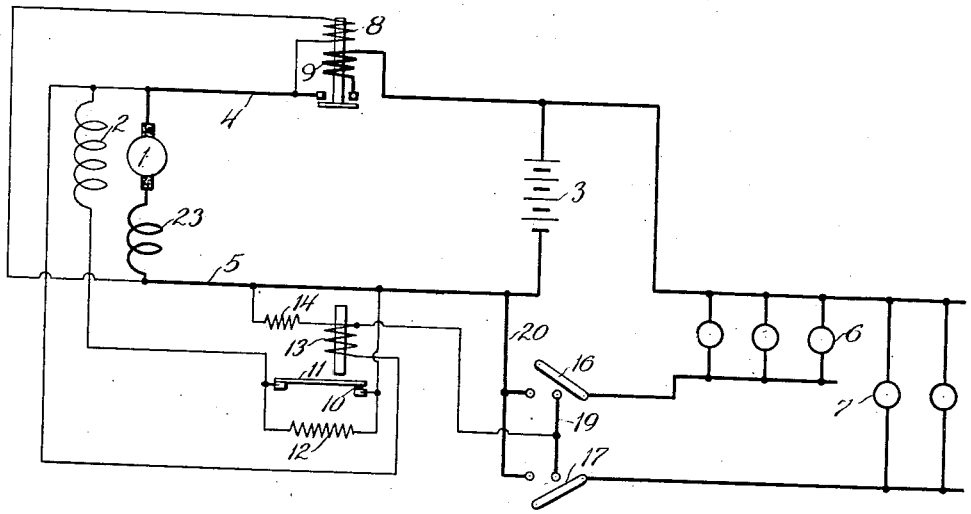

Fig. 4 illustrates a further modification in which the regulating series coils are not employed. The shunt coil 13 is connected across the generator through the resistance 14 as in Fig. 1 and either lamp switch is effective to short-circuit this resistance as previously described. This modified arrangement will tend to hold a predetermined constant voltage on the system as long as the lamp circuit is open and thereafter will maintain a constant voltage at a predetermined lower value. If desired the generator may be provided with a series field winding 23 which opposes the shunt 13 field winding 2 to limit the generator output.

Figs. 5 and 6 illustrate a practical embodiment of the regulating apparatus. The regulator and the automatic switch are preferably mounted together on an insulating base 24. The coils 13 and 15 of the regulator are wound together to form the electromagnetic winding 25 which controls the vibrations of the armature 11. The armature is pivoted adjacent one end on a support 26 rising from the base at one side of the winding. The opposite end of the armature terminates in a flexible member which carries the vibratory contact 10. This contact, in vibrating, is adapted to rapidly make and break contact with an adjustable contact 27. The contact 27 preferably consists of a screw mounted in the upper end of a support 28 and adjustable, by turning, toward or away from the vibratory contact. The contact is held in its adjusted position by a spring detent 28 coöperating with the milled edge of the screw. In its normal position the armature is so held that the contacts 10 and 27 are normally in engagement. To provide for holding the armature in its normal position, the armature is extended beyond the pivot. The extended end is engaged by means of an adjustable spring mounted abutment 29. The abutment 29 consists of a threaded stud passing freely through the end of the armature and yieldingly attached by means of a spring 30 to the base. An adjustable nut 31 on the stud above the armature is adapted to be turned up or down to adjust the tension to be exerted by the spring. The nut is provided with a depending knife edge 32 which co-operates with a depression 33 in the armature to hold the nut from turning. Suitable guards 34 preferably of brass or other non-magnetic material are attached to the magnet frame and extend on opposite sides of the vibratory contact support. The electrical connections from the shunt field winding to the vibratory armature may be made below the insulating base to the anchoring stud for the spring, and the connections from the field to the fixed contact may be made through the support for the contact. The resistance 12 is preferably in the form of a coil and is supported on the insulating base. One end of the resistance may be electrically connected with the support for the contact 27 while the other end may be connected to the armature support 26.

The automatic switch is similar in construction to the regulator except that the fixed contact is mounted below the movable contact so that the spring will normally hold the contacts separated. Energization of the electromagnetic winding 35 for the switch will close the contacts against the pull of the spring.

The supporting base and the regulator and switch members are preferably inclosed in a casing provided with a bottom 36 and a removable cover 37. The cover may be held in place by the stud 38 attached to the base and passing through a depression 39 in the cover. A spring 40 surrounds the end of the stud above the cover and is compressed to hold the cover in place by the nut 41. A seal 42 may be utilized to prevent unauthorized tampering with the device.

What I claim as new and desire to secure by Letters Patent of the United States is:

1. In combination, a variable source of electrical supply, a plurality of load circuits to be supplied thereby, a regulator for said source, said regulator including a compound operating coil, one winding of said coil being connected in a load circuit and another winding of said coil being responsive to variations in potential of one of said load circuits, a resistance in series with said latter winding, and means for causing said winding to predominate in the regulation of said source by short-circuiting said resistance upon connection of additional load circuits thereto.

2. In combination, a variable source of electrical supply, a plurality of load circuits to be supplied thereby, regulating means for said source including an electro-responsive switch having jointly acting operating windings, one of said windings being connected in a load circuit, another of said windings being responsive to variations in potential of one of said load circuits, a resistance in series with said latter winding, switches for connecting additional load circuits to said source and electrical connections for insuring predominance of said winding in the regulation of said source by short-circuiting said resistance upon closure of any one of said switches.

3. In combination, a variable source of electrical supply, a plurality of load circuits to be supplied thereby, regulating means for said source including a resistance and an electro-responsive switch for governing the exclusion and inclusion thereof, said switch being responsive jointly to current variations and to voltage variations in certain of said load circuits and a switch for connecting certain of said load circuits to said source and simultaneously causing said voltage variations to be predominant in the action of said regulating means.

4. In an automobile lighting system, a variable speed generator provided with a shunt field, a storage battery and lamps supplied thereby, a resistance in series with said field, a vibratory contact for intermittently short-circuiting said resistance, electro-magnetic means for controlling the vibrations of said contact, said means including a coil in series with the battery and a coil connected across the generator through a resistance, a second resistance in series with said coil, switches for controlling the circuits for said lamps and connections whereby one of said resistances in series with said coil connected across the generator is short-circuited when any one of said lamp switches is closed.

In witness whereof, I have hereunto subscribed my name in the presence of two witnesses.

CLARK T. HENDERSON.

Witnesses:
F. H. HUBBARD,
JEANETTE S. BROCK.